(12) United States Patent
Shibano et al.

(10) Patent No.: US 6,780,371 B2
(45) Date of Patent: Aug. 24, 2004

(54) PROCESS FOR INLINE PRODUCING BIAXIALLY ORIENTED RELEASING FILM

(75) Inventors: Tomishi Shibano, Saitama (JP); Toru Nakamura, Saitama (JP)

(73) Assignee: Lintec Corporation, Tokyo (JP)

(*) Notice: Subject to any disclaimer, the term of this patent is extended or adjusted under 35 U.S.C. 154(b) by 258 days.

(21) Appl. No.: 09/897,131

(22) Filed: Jul. 3, 2001

(65) Prior Publication Data

US 2002/0027313 A1 Mar. 7, 2002

(30) Foreign Application Priority Data

Jul. 19, 2000 (JP) .................................. 2000-218607

(51) Int. Cl.[7] .......................... B29C 35/10; B29C 55/14; B29C 59/16; B29C 71/04
(52) U.S. Cl. ................. 264/446; 264/210.3; 264/210.7; 264/235.8; 264/289.3; 264/290.2; 264/447; 264/448; 264/479; 264/495
(58) Field of Search ............................... 264/446, 447, 264/210.3, 210.7, 235.8, 289.3, 290.2, 448, 479, 495

(56) References Cited

U.S. PATENT DOCUMENTS 4,933,124 A 6/1990 Duncan
5,302,459 A * 4/1994 Kim et al. ............ 264/210.7 X
6,309,730 B1 * 10/2001 Sumi .......................... 428/141
6,649,216 B2 * 11/2003 Gust et al. .................. 427/173

FOREIGN PATENT DOCUMENTS

DE 35 13 526 A1 10/1986

* cited by examiner

Primary Examiner—Leo B. Tentoni
(74) Attorney, Agent, or Firm—Oblon, Spivak, McClelland, Maier & Neustadt, P.C.

(57) ABSTRACT

There is disclosed a process for inline producing a biaxially oriented releasing film by consecutively orienting a non oriented film (polyethylene terephthalate or polypropylene) in the machine or transverse direction one by one which comprises coating at least one side of a film in a state prior to biaxial orientation with an addition reaction type silicone based releasing agent (e.g. solvent type), preferably incorporated with a photosensitizer; biaxially orienting the film; thereafter heat annealing the same; and subsequently performing ultraviolet ray irradiation. The process enables easy production of the releasing film which is excellent in releasability, non-migration property of silicone, and productivity, and which is well suited for use in the production of pressure sensitive adhesive labels and tapes, ceramic green sheets, synthetic leather, etc.

19 Claims, 1 Drawing Sheet

US 6,780,371 B2

PROCESS FOR INLINE PRODUCING BIAXIALLY ORIENTED RELEASING FILM

BACKGROUND OF THE INVENTION

1. Field of the Invention

The present invention relates to a process for producing a releasing film (identical with "release film") which is of service to a pressure sensitive adhesive product and/or an adhesive product such as a pressure sensitive adhesive label and/or tape, a heat sensitive adhesive sheet and a prepreg adhesive sheet, and a releasing film which is employed as a carrier for a ceramic green sheet, synthetic leather and the like.

2. Description of the Related Arts

Most of releasing films that are employed for a pressure sensitive adhesive product and an adhesive product, and for the production of a ceramic green sheet, synthetic leather and the like are each produced at the present time by a process comprising the steps of forming a substrate film, and coating the resultant film with a silicone based releasing agent (identical with "silicone based release agent") by the use of a coating machine of another production line. In order to enhance the productivity thereof, however, there has hitherto been frequently proposed a process for producing a releasing film by coating a substrate film with a silicone based releasing agent in an inline film sheeting (extrusion) step. For example, there is described in Japanese Patent Application Laid Open No. 6724/1982 (Showa 57), a process for producing a releasing film by coating a biaxially oriented polypropylene film with a heat curable silicone in an inline coating step, more specifically, there is described therein a releasing film which is produced by a process comprising extruding polypropylene with a T die, then coating the extruded polypropylene with silicone, followed by uniaxial or biaxial orientation of the same, and heat curing the silicone in orientation and annealing steps. Moreover, there is described in Japanese Patent Application Laid Open No.171916/1983 (Showa 58), a process for producing a releasing film made of biaxially oriented polypropylene film by a process comprising subjecting polypropylene film to orientation in the machine direction, coating the polypropylene film with a heat curable silicone, followed by orientation in the transverse direction, and heat setting the oriented film under restricted conditions. Further, there are described in U.S. Pat. No. 4,851,166, processes for producing biaxially oriented polypropylene film and biaxially oriented polyethylene terephthalate film, wherein the films are inline coated with a heat curable silicone as is the case with the aforesaid Japanese Patent Application Laid Open No.6724/1982 (Showa 57), but in a different manner therefrom in that such a proposal is made that the heat curable silicone is restricted in more detail, and a silicone based releasing agent should contain a reaction inhibitor and a platinum base catalyst.

The factors in common with each of the above-mentioned three proposals are that a coat of a silicone based releasing agent is applied in the production step of a biaxially oriented film, and the silicone based releasing agent is subjected to heat curing. Forever, the production process proposed in any of the three items fails to assure an energy quantity necessary for heat curing the silicone through orientation in a biaxially orientation apparatus or through heating treatment in an annealing step, whereby part of the silicone is more prone to remain unreacted. For the purpose of sufficiently heat curing the silicone, it is necessary to assure the energy by enlarging an annealing furnace or decreasing the rate of film formation, which however extremely worsening the productivity. If part of a silicone releasing agent remains unreacted in the coated layer, the releasing film fails to give the objective releasing performance (identical with "release performance"), sometimes bringing about non-releasability of the releasing film to be released. Moreover in the case of preparing a pressure sensitive adhesive label and/or tape by the use of such a releasing film, the unreacted silicone migrates to a pressure sensitive adhesive layer, thus markedly deteriorating pressure sensitive adhesive properties. That is to say, it is impossible for any of the foregoing proposals to assure the releasing performance and non-migration property that are of utmost importance for a releasing film.

SUMMARY OF THE INVENTION

In such circumstances, an object of the invention is to provide a process for inline producing a biaxially oriented releasing film which process is capable of sufficiently curing a silicone based releasing agent applied to the film and therefore, is free from insufficiency in the releasing performance or migration of silicone accompanying the presence of unreacted silicone.

Other objects of the present invention will be obvious from the text of this specification hereinafter disclosed.

As a result of intensive extensive research and investigation accumulated by the present inventors in order to solve the above-mentioned problems, it has been found that a process is highly effective which comprises coating a film to be biaxially oriented with a silicone based releasing agent in the production step of the biaxially oriented film, and curing the resultant film by the combinational use of ultraviolet ray irradiation and annealing. The present invention has been accomplished on the basis of the above-mentioned findings and information.

That is to say, the present invention provides:

(1) a process for inline producing a biaxially oriented releasing film by consecutively orienting a non-oriented film in the machine and transverse directions one by one which comprises coating at least one side of a film in a state prior to biaxial orientation with an addition reaction type silicone based releasing agent, biaxially orienting said film, thereafter heat annealing the same, and subsequently performing ultraviolet ray irradiation;

(2) The process for inline producing a biaxially oriented releasing film as set forth in the preceding item (1), wherein the addition reaction type silicone based releasing agent is incorporated with a photosensitizer;

(3) The process for inline producing a biaxially oriented releasing film as set forth in the preceding item (1) or (2) wherein prior to the coating of said releasing agent, the film is subjected to surface activating treatment;

(4) The process for inline producing a biaxially oriented releasing film as set forth in any of the preceding items (1) to (3), wherein the film comprises polyethylene terephthalate or polypropylene;

(5) The process for inline producing a biaxially oriented releasing film as set forth in the preceding item (1), wherein the coating of the addition reaction type silicone based releasing agent is preceded by the orientation in the machine direction, and followed by the orientation in the transverse direction;

(6) The process for inline producing a biaxially oriented releasing film as set forth in the preceding item (1), wherein the addition reaction type silicone based releasing agent further comprises at least one member selected from the group consisting of addition reaction inhibitors, release modifiers, adhesion improvers and solvents; and (7) The process for inline producing a biaxially oriented releasing film as set forth in the preceding item (1), wherein the ultraviolet ray irradiation is carried out with at least one non-electrode ultraviolet ray lamp.

Figure 1:
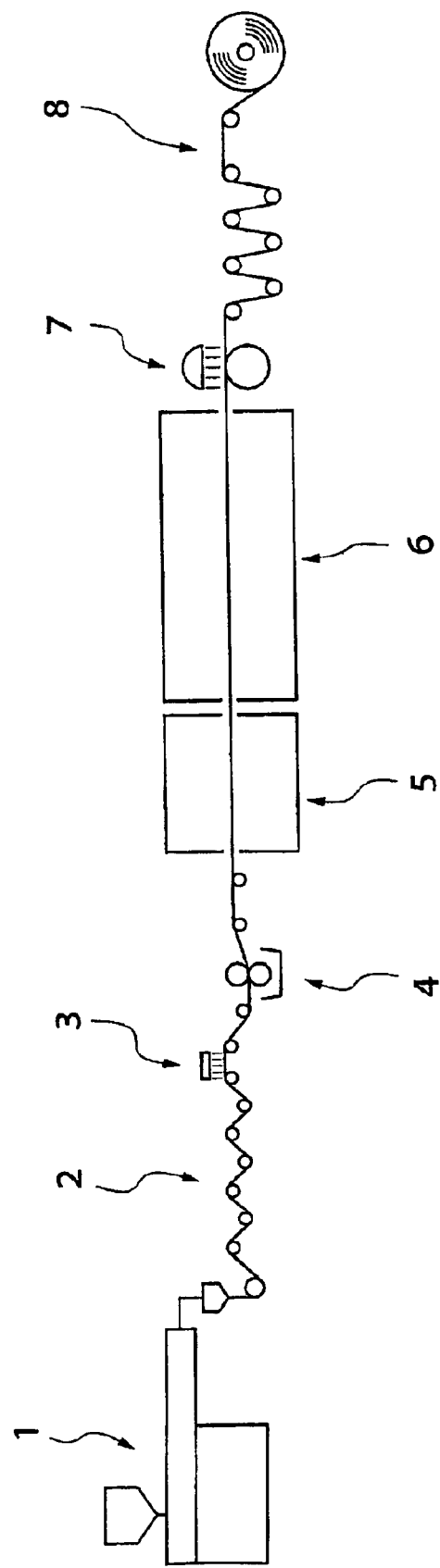
FIG. 1 is a schematic illustration of one embodiment of the production process for a releasing film according to the present invention, wherein the symbols shall each have the following designation.

1: extrusion film sheeting step (Step ①)
2: machine direction orientation step (Step ②)
3: surface activating treatment (corona discharge treatment) step
4: releasing agent coating step (Step ③)
5: transverse direction orientation step (Step ④)
6: heating annealing step (Step ⑤)
7: ultraviolet ray irradiation step (Step ⑥)
8: film winding step (Step ⑦)

DESCRIPTION OF THE PREFERRED EMBODIMENTS

In the following, detailed description will be given of the present invention with reference to an example of the production line. Firstly in the 1: extrusion film sheeting step (Step ①) there is extrusion film sheeted, a stretchable thermoplastic resin such as polyethylene terephthalate or polypropylene into a film form from a T-die extruder. In the 2: machine direction orientation step (Step ②), the film is oriented in the machine direction by varying the peripheral velocity of a heating roll. In the 4: releasing agent coating step (Step ③), an addition reaction type silicone based releasing agent is applied as coating. In the 5: transverse direction orientation step (Step ④), the film is oriented in the transverse direction with a transversely orienting machine such as a tender, while heating. Subsequently in the 6: heating annealing step (Step ⑤), the oriented film is subjected to heating annealing treatment. In the 7: ultraviolet ray irradiation step (Step ⑥), the treated film is irradiated with a ultraviolet ray irradiation lamp. In the 8: film winding step (Step ⑦), the objective releasing film is produced by winding the same.

Regarding the order of orientation, either of orientation in the machine and transverse directions may precede the other, but it is preferable from the viewpoint of equipment structure and the like that in accordance with the embodiment in FIG. 1, orientation in the machine direction be firstly carried out (Step ②), followed by orientation in the transverse direction (Step ④).

The temperature and draw ratio of the film among the production conditions in the foregoing respective steps vary depending upon the type of the thermoplastic resin. In the case of polyethylene terephthalate, the temperature of extrusion in the Step ① is in the range of approximately 280 to 300° C.; the temperature of orientation in the machine direction in the Step ② is in the range of 70 to 120° C., preferably 80 to 110° C. and the draw ratio in the same is in the range of 2 to 7, preferably 2.5 to 5; the temperature of orientation in the transverse direction in the Step ④ is in the range of 70 to 150° C., preferably 90 to 130° C. and the draw ratio therein is in the range of 2 to 7, preferably 3 to 5; and the temperature of heat treatment by annealing step (Step ⑤) is in the range of 130 to 250° C., preferably 150 to 240° C., and the heat treatment time therein is in the range of 1 to 5 seconds.

The addition reaction type silicone based releasing agent may be applied as coating prior to biaxial orientation, that is, in a non-orientation state, or after a first axial orientation. However, it is preferable that in accordance with the embodiment in FIG. 1, the agent be applied after first axial orientation from the viewpoint of capability of regulating the coated amount in a state of finished releasing film by both the coating amount and the draw ratio.

The coating system of the addition reaction type silicone based releasing agent may be properly optionally selected from conventional well known systems such as gravure coat method, bar coat method and multi-roll coat method. A proper coating weight is such that results in the range of 0.01 to 2.0 g/m$^2$, preferably 0.02 to 0.2 g/m$^2$ as expressed in terms of solid content in a state of finished releasing film after biaxial orientation followed by curing treatment.

It is suitable that the ultraviolet ray irradiation as the Step ⑥ be carried out subsequent to the heating annealing as the Step ⑤ in a state of heated film. The irradiation, when carried out after film cooling, is less effective. The addition reaction type silicone based releasing agent is effectively cured, and unreacted silicone can be made less prone to remain by consecutively conducting the heating treatment as the Step ⑤ and ultraviolet ray irradiation as the Step ⑥ in this order.

Usable ultraviolet ray lamps to be used for ultraviolet ray irradiation are available from previously well known lamps such as high pressure mercury vapor lamp, metal halide lamp, high power metal halide lamp, non-electrode ultraviolet lamp. Of these, non-electrode ultraviolet ray lamp is preferable from the viewpoint of curability of the silicone based releasing agent. The ultraviolet ray irradiation output may be properly optionally selected, and is preferably in the range of 100 to 360 W/cm. Electron beam (EB) irradiation in place of ultraviolet ray irradiation, although being taken into consideration, is not practical, since almost all the surfaces of silicone are liable to be damaged by excessive EB irradiation, thereby markedly impairing the releasability of the releasing agent.

In such a way, the film in which the addition reaction type silicone is applied, heat cured and ultraviolet irradiated, is allowed to cool and taken up by winding into a releasing film in the Step ⑦.

In order to further enhance the adhesiveness of silicone, it is possible as indicated by the symbol 3 in FIG. 1 to insert between the Step ② and Step ③, a step of surface activating treatment such as corona treatment, ozone treatment and flame treatment.

The thickness of the releasing film after the orientation processing may be properly optionally selected, and it is in the range of 5 to 150 μm, preferably 10 to 120 μm.

As stretchable thermoplastic resins which are used as a substrate material for the releasing film according to the present invention, there are usable such resins same as those that have heretofore been used as a substrate material for the releasing film. Specifically, suitable examples thereof are polyethylene terephthalate and polypropylene from the viewpoints of smoothness, thickness uniformity, heat resistance, strength and cost.

In addition, the thermoplastic resins may be incorporated at need, with conventional well known additives such as powdery grains of silica, kaolin, calcium carbonate, alumina, titanium oxide, organic grains and deposited grains, a stabilizing agent, an antioxidant and an antistatic agent.

In what follows, detailed description will be given of the silicone based releasing agent to be used in the present invention.

Examples of types of the silicone based releasing agents that are used for releasing paper and releasing films include addition reaction type, condensation reaction type, radical addition type (mercapto-silicone type), radical polymerization type (silicone acrylate type), cation polymerization type (epoxy-containing silicone type) and the like. Of these, the addition reaction type silicone is used in the present invention from the standpoints of releasability and silicone migration.

Specifically, the radical addition type and cation polymerization type silicone based releasing agents, which are known as ultraviolet ray curable type, are apt to cause interaction between reactive functional group components or reaction residue groups each contained in the silicone and components such as resins for a pressure sensitive adhesive agent and synthetic leather, whereby excellent releasability becomes difficult to gain. Moreover, the radical polymerization type silicone based releasing agent, which contains acrylate group as a functional group, are apt to cause strong interaction with an acrylic pressure sensitive adhesive agent, whereby good releasability becomes difficult to gain. In addition, the radical addition type silicone based releasing agent, which is known as electron beam curable type, gives rise to difficulty in controlling the electron beam to be irradiated, thus frequently causing serious damage to the surface of silicone to impair the releasability. By the reasons described hereinbefore, the addition reaction type silicone based releasing agent is used as the silicone based releasing agent in the present invention.

The addition reaction type silicone based releasing agent, which can be properly and optionally selected for use from among conventional well known ones, is composed at least of a double bond-bearing silicone base polymer and a crosslinking agent, and is subjected to addition reaction by adding a catalyst. Preferably, the releasing agent is incorporated as desired, with a release control agent, an inhibitor, an adhesion improver (identical with "anchor improver"), solvent (organic solvent, water, etc.) and an other additive such as silica. Incidentally, the addition reaction type silicone based releasing agent which is available on the market is incorporated in advance with principal ingredients excluding a catalyst. Thus it is a general procedure that a catalyst be added thereto immediately before coating work.

The form of the silicone based releasing agent may be any of solvent type, emulsion type and solventless type (solvent free type), provided that the silicone resin belongs to addition reaction type. Of these, solvent type silicone based releasing agent is suitable in particular from the aspects of quality and easiness of handling.

The aforesaid double bond-bearing silicone base polymer is not specifically limited, but may be selected for use from those that have heretofore been customarily used as a releasing agent composed of a heat curable addition reaction type silicone, and is exemplified by at least one member selected from polyorganosiloxanes having an alkenyl group as a functional group in a molecule. Preferable examples of said polyorganosiloxanes having an alkenyl group as a functional group in a molecule include polydimethylsiloxane (degree of polymerization in the range of 100 to 10,000, approximately) having a vinyl group or a hexenyl group as a functional group, and the mixture of the two.

The crosslinking agent is exemplified by polyorganosiloxane having in its one molecule, at least two hydrogen atoms each bonded to a silicon atom, specifically by dimethylsiloxane/methylhydrogen-siloxane copolymer the end of which is hindered with dimethylhydrogen-siloxy group, dimethylsiloxane/methylhydrogen-siloxane copolymer the end of which is hindered with trimethylsiloxy group, poly(methylhydrogen-siloxane) the end of which is hindered with trimethylsiloxy group and poly (hydrogen silsequioxane). The amount of the exemplified crosslinking agent to be used is selected in the range of 0.1 to 100 parts by weight, preferably 0.3 to 50 parts by weight based on 100 parts by weight of the double bond-bearing silicone base polymer.

The foregoing catalyst, which is exemplified by a platinum base catalyst, a palladium base catalyst and a rhodium base catalyst, is employed in a proper amount for the purpose of accelerating the polymerization reaction. For instance, the amount of the catalyst to be used therein is selected in the range of 0.1 to 10 parts by weight, preferably 0.4 to 5 parts by weight based on 100 parts by weight of the principal ingredient, that is, total amount of the double bond-bearing silicone base polymer and the crosslinking agent.

The release control agent to be used therein is exemplified by dimethylpolysiloxane and silicone base polymer.

The aforesaid inhibitor is a component used for the purpose of imparting the silicone based releasing agent with shelf life stability at room temperature, and is specifically exemplified by 3,5-dimethyl-1-hexyne-3-ol; 3-methyl-1-pentene-3-ol; 3-methyl-3-pentene-1-in; 3,5-dimethyl-3-hexene-1-in; cyclic tetravinyl-siloxane; and benzotriazole.

The process according to the present invention is effective even in the case where a photosensitizer is not added to the addition reaction type silicone based releasing agent. However, it is preferable to add a photosensitizer thereto, since the curability thereof is markedly enhanced thereby.

The photosensitizer to be used in the addition reaction type silicone is not specifically limited, but may be properly optionally selected for use from those that have heretofore been customarily used in ultraviolet curable resin. Examples thereof include benzoins, benzophenones, acetophenones, α-hydroxy ketones, α-amino-ketones, α-diketones, α-diketone dialkyl acetals, anthraquinones, thioxanthones and the other compounds.

The benzoins are exemplified by benzoin, benzoin methyl ether, benzoin ethyl ether, benzoin isopropyl ether, benzoin n-butyl ether, benzoin isobutyl ether and a compound in which benzoin is bonded to both ends of polydimethylsiloxane by ether linkage. The benzophenones are exemplified by benzophenone, p-phenylbenzophenone, 4,4'-diethylaminobenzophenone, dichlorobenzophenone, trimethylsilylbenzophenone and 4-methoxybenzophenone. The acetophenones are exemplified by acetophenone, diethylaminobenzophenone, 3-methylacetophenone, 4-methylacetophenone, 4-allylacetophenone, 3-pentylacetophenone and propiophenone. The α-hydroxy ketones are exemplified by 2-hydroxy-1-(4-isopropyl) phenyl-2-methylpropane-1-one, 2-hydroxy-2-methyl-1-phenylpropene-1-one, 1-[4-(2-hydroxyethoxy)phenyl]-2-hydroxy-2-methylpropane-1-one and 1-hydroxycyclohexylphenyl-ketone. The α-aminoketones are exemplified by 2-methyl-1-[4-(methyithio)-phenyl]-2-morpholinopropane-1-one and 2-benzyl-2-dimethylamino-1-(4-morphoinophenyl)butane-1-one. The α-diketones are exemplified by benzyl and diacetyl. The α-diketone dialkylacetals are exemplified by benzyldimethyl acetal and benzyldiethyl acelal. The anthraquinones are exemplified by 2-methyl anthraquinone, 2-ethyl anthraquinone, 2-tert-butyl anthraquinone and 2-amino anthraquinone. The thioxanthones are exemplified by 2-methyl-thioxanthone, 2-ethylthioxanthone, 2-chlorothioxanthone, 2,4-dimethylthioxanthone and 2,4-diethylthioxanthone. The other compounds are exemplified by tertiary amines such a triphenylamine and p-dimethylamino benzoic ester, and azo compounds such as azobis(isobutyronitrile).

Any of the above-exemplified photosensitizers may be used alone or in combination with at least one other. The amount thereof to be used is selected in the range of 0.01 to 30 parts by weight, preferably 0.05 to 20 parts by weight based on 100 parts by weight of the total amount of the addition reaction type silicone and the crosslinking agent.

In summarizing the working effect and advantages of the present invention, the releasing film is easily obtained which is excellent in releasability, characterized by minimized migration property of silicone base polymer, and maximized in productivity by the inline coating of the silicone based releasing agent in the production step for biaxially oriented film, subsequent heat treatment in the orientation annealing step, followed by ultraviolet ray irradiation step.

The silicone based releasing film according to the present invention is well suited for serving to a pressure sensitive adhesive product and adhesive product, and for the production of ceramic green sheets, synthetic leather and the like.

In the following, the present invention will be described in more detail with reference to comparative examples and working examples, which however shall never limit the present invention thereto.

Evaluations were made of the various characteristics of each of the releasing films that were obtained through the working examples and comparative examples in accordance with the evaluation procedures as described hereunder.

(1) Curability

Curability was evaluated in accordance with the following criteria by the method comprising vigorously rubbing the surface of a cured coating on a releasing film ten times with fingers, and observing the smear and rub-off on the release coating.

◎: no smear nor rub-off observed at all.
○: slight smear observed (not causing practical problem)
Δ: some smear and rub-off observed (sometimes causing practical problem)
×: marked smear with considerable rub off observed (causing practical problem)

(2) Peeling force

A pressure sensitive adhesive sheet was prepared by coating a cured coat on a releasing film with an acrylic pressure sensitive adhesive (manufactured by Toyo Ink Mfg. Co.,Ltd. under the trade name "BPS-5127") so that a dry thickness of the coat became 40 $\mu$m, drying the coat for 2 minutes by means of a hot air circulation type oven at 100° C., and laminating a surface substrate (wood free paper) on the film. The resultant specimens were allowed to stand under 23° C. and 65% R.H. for 24 hours, and cut into pieces having a width of 20 mm each. By the use of a tension testing instrument, the releasing film of each specimen was tested for peeling at an angle of 180 degrees at a velocity of 300 meter per minute to measure the force required for peeling to evaluate the peeling force.

(3) Non-migration property of silicone

Non-migration property of silicone was evaluated according to the following criteria by a method comprising laminating a cured coat on a releasing film with a polyethylene terephthalate film (PET film), applying a load of 1.97 N/mm$^2$ to the laminate thus formed, allowing the laminate to stand for 24 hours, then peeling the PET film off from the laminate, painting laminated surface with a felt-tipped marker (oily ink), and observing the extent of repelling to examine the degree of silicone migration.

◎: no repelling observed not causing migration at all
○: very little repelling observed slightly causing migration (not causing practical problem)
Δ: some migration observed somewhat causing migration (sometimes causing practical problem)
×: marked migration observed considerably causing migration (causing practical problem)

(4) Subsequent adhesion

Subsequent adhesion was evaluated by a method comprising laminating a cured coat on a releasing film with a pressure sensitive adhesive tape (manufactured by Nitto Denko Corporation under the trade name "PET 31B Tape"), applying a load of 9.81×10$^{-3}$ N/mm$^2$ to the laminate thus formed, allowing the laminate to stand at 70° C. for 24 hours further under the conditions of 23° C. and 65% R.H for 24 hours, thereafter peeling off the pressure sensitive adhesive tape from the laminate, sticking the tape on a stainless steel sheet, peeling off the tape from the stainless steel sheet at an angle of 180 degrees at a velocity of 300 meter per minute to measure the peel adhesion, and expressing in percentage the peel adhesion measured based on the peel adhesion inherent in a fresh pressure sensitive adhesive tape which has never been in contact with a releasing film.

EXAMPLE 1

A releasing film was prepared according to the embodiment shown in FIG. 1. In the first place, polyethylene terephthalate (PET) was melt extruded at 290° C. with a melt extruder, and solidified into the form of sheet by cooling with a cooling roll (Step ①). Subsequently, the resultant sheet was oriented in the machine direction at 85° C. at a draw ratio of 3.2 (Step ②). Thereafter, the coating solution was uniformly applied through gravure coat method to the uniaxially oriented PET sheet (Step ③), which solution had been prepared by adding 2 parts by weight of a platinum base catalyst (solid content of 100% by weight, manufactured by Dow Corning Toray Silicone Corporation under the trade name "SRX-212") and one (1) part by weight of 1-hydroxycyclohexyl phenylketone as a photosensitizer to 100 parts by weight of a solvent type addition reaction type silicone releasing agent (solid content of 30% by weight, manufactured by Dow Corning Toray Silicone Corporation under the trade name "SRX-211") comprising as principal ingredients, polydimethyl-siloxane having a vinyl group as a functional group and a crosslinking agent (polymethylhydrogen siloxane), and diluting the mixture thus prepared with an organic solvent comprising toluene as a principal ingredient. Subsequently, the coated PET sheet was oriented in the transverse direction at 100° C. at a draw ratio of 3.2 by means of a tender (Step ④). Then the PET sheet was subjected to heating annealing at 230° C. (Step ⑤). Immediately thereafter, the PET sheet was irradiated with ultraviolet ray by the use of a ultraviolet irradiating machine equipped with two H bulbs of 240W/cm manufactured by Fusion Corp. (Step ⑥). The PET sheet thus irradiated was allowed to cool, and taken up by winding at a processing velocity of 200 meter/minute (Step ⑦) to prepare a releasing film having a silicone based releasing agent coating amount of 0.03 g/m$^2$ and an overall thickness of 25 $\mu$m. Thus, various characteristics of the resultant releasing film are given in Table 1.

EXAMPLE 2

The procedure in Example 1 was repeated to prepare a releasing film except that use was made of a solventless type addition reaction type silicone releasing agent (solid content of 100% by weight, manufactured by Dow Corning Toray Silicone Corporation under the trade name "BY24-482") comprising as principal ingredients, polydimethylsiloxane having a vinyl group as a functional group and a crosslinking agent (polymethylhydrogen siloxane); the platinum base catalyst "SRX-212" was used in an amount of 1.5 part by weight based on 100 parts by weight of the releasing agent; the use of a photosensitizer and a solvent was omitted; and the coating was carried out through multi-roll (5 sets) coat method instead of gravure coat method. Thus various characteristics of the resultant releasing film are given in Table 1.

EXAMPLE 3

The procedure in Example 1 was repeated to prepare a releasing film except that use was made of an emulsion type addition reaction type silicone releasing agent (manufactured by Shin-Etsu Chemical Co, Ltd. under the trade name "Emulsion KM 768") comprising as principal ingredients, polydimethyl-siloxane having a vinyl group as a functional group and a crosslinking agent (polymethylhydrogen siloxane); platinum base catalysts (manufactured by Shin-Etsu Chemical Co.,Ltd. under the trade name "PM-6A" and "PM-6B", respectively) were used in amounts of 1.2 part and 1.8 part, respectively by weight based on 100 parts by weight of the releasing agent; and after diluting with water one part by weight of 1-{4-(2-hydroxyethoxy)-phenyl} 2-hydroxy-2-methyl-1-propane-1-one as a photosensitizer was added to the releasing agent to prepare a coating solution. Various characteristics of the resultant releasing film are given in Table 1.

EXAMPLE 4

The procedure in Example 1 was repeated to prepare a releasing film except that use was made of a solventless type addition reaction type silicone releasing agent (solid content of 100% by weight, manufactured by Dow Corning Toray Silicone Corporation under the trade name "BY24-482") comprising as principal ingredients, polydimethylsiloxane having a vinyl group as a functional group and a crosslinking agent (polymethylhydrogen siloxane); the platinum base catalyst "SRX-212" was used in an amount of 1.5 part by weight based on 100 parts by weight of the releasing agent; the use of a photosensitizer and a solvent was omitted; the coating was carried out through multi-roll (5 sets) coat method instead of gravure coat method, and the processing velocity was set on 100 meter/minute in place of 200 meter/minute. Thus various characteristics of the resultant releasing film are given in Table 1.

EXAMPLE 5

A releasing film was prepared according to the embodiment shown in FIG. 1. In the first place, polypropylene was melt extruded at 290° C. with a melt extruder, and was solidified into the form of sheet by cooling with a cooling roll (Step ①). Subsequently, the resultant sheet was oriented in the machine direction at a draw ratio of 5.0 (Step ②). Thereafter, corona discharge treatment was carried out. Then the coating solution same as in Example 1 was uniformly applied through gravure coat method to the uniaxially oriented polypropylene sheet (Step ③). Subsequently, the coated polypropylene sheet was oriented in the transverse direction at 160° C. at a draw ratio of 10 by means of a tenter (Step ④). Then the polypropylene sheet was subjected to heating annealing at 170° C. (Step ⑤). Immediately thereafter, the polypropylene sheet was irradiated with ultraviolet ray by the use of a ultraviolet irradiating machine equipped with two H bulbs of 240 W/cm manufactured by Fusion Corp. (Step ⑥). The polypropylene sheet thus irradiated was allowed to cool, and taken up by winding at a processing velocity of 300 meter/minute (Step ⑦) to prepare a releasing film having a silicone based releasing agent coating amount of 0.03 g/m$^2$ and an overall thickness of 25 μm. Thus, various characteristics of the resultant releasing film are given in Table 1.

COMPARATIVE EXAMPLE 1

The procedure in Example 1 was repeated to prepare a releasing film except that ultraviolet ray irradiation was omitted. Thus, various characteristics of the resultant releasing film are given in Table 1.

TABLE 1

| | Curability | Peeling force (mN/20 mm) | Non-migration property of silicone | Subsequent adhesion (%) |
|---|---|---|---|---|
| Example 1 | ⊚ | 110 | ⊚ | 100 |
| Example 2 | ⊚ | 100 | ⊚ | 99 |
| Example 3 | ⊚ | 90 | ⊚ | 95 |
| Example 4 | ○ | 150 | ○ | 90 |
| Example 5 | ⊚ | 130 | ⊚ | 92 |
| Comparative Example 1 | x | 200 | x | 80 |

What is claimed is:

1. A process for inline producing a biaxially oriented releasing film by consecutively orienting a non-oriented film in a machine direction and a transverse direction separately, said process comprising coating at least one side of a film in a state prior to biaxial orientation with an addition reaction type silicone based releasing agent, biaxially orienting said film, thereafter heat annealing said film, and subsequently performing ultraviolet ray irradiation to obtain a biaxially oriented releasing film.

2. The process for inline producing a biaxially oriented releasing film according to claim 1, wherein the addition reaction type silicone based releasing agent further comprises a photosensitizer.

3. The process for inline producing a biaxially oriented releasing film according to claim 1 or 2, wherein prior to said coating with said addition reaction type silicone based releasing agent, said film is subjected to a surface activating treatment.

4. The process for inline producing a biaxially oriented releasing film according to claim 1, wherein said film comprises polyethylene terephthalate or polypropylene.

5. The process for inline producing a biaxially oriented releasing film according to claim 1, wherein said coating with said releasing agent is preceded by orientation of said film in said machine direction, and followed by orientation of said film in said transverse direction.

6. The process for inline producing a biaxially oriented releasing film according to claim 1, wherein said addition reaction type silicone based releasing agent further comprises at least one member selected from the group consisting of inhibitors, release control agents, adhesion improvers, solvents, and mixtures thereof.

7. The process for inline producing a biaxially oriented releasing film according to claim 1, wherein said ultraviolet ray irradiation is carried out with at least one non-electrode ultraviolet ray lamp.

8. The process of claim 1, wherein said biaxially oriented releasing film is oriented first in said transverse direction, followed by orientation in said machine direction.

9. The process of claim 1, wherein said coating is gravure coating, bar coating, and/or multi-roll coating.

10. The process of claim 1, wherein said coating comprises coating said film to a coating weight of 0.01 to 2.0 g/m$^2$, expressed as solid content of said coating.

11. The process of claim 1, wherein said ultraviolet ray irradiation is carried out at an output of from 100 to 360 W/cm.

12. The process of claim 1, wherein said addition reaction type silicone based releasing agent comprises a double bond-bearing silicone base polymer and a crosslinking agent.

13. The process of claim 12, wherein said double bond-bearing silicone base polymer is selected from the group consisting of polydimethylsiloxane having a degree of polymerization of from approximately 100 to approximately 10,0000, and a vinyl and/or a hexenyl substituent.

14. The process of claim 12, wherein said crosslinking agent comprises a polyorganosiloxane having at least one hydrogen atom bonded to a silicon atom.

15. The process of claim 12, wherein said crosslinking agent is present in an amount of from 0.1 to 100 parts by weight based on 100 parts by weight of said double bond-bearing silicone base polymer.

16. The process of claim 15, wherein said crosslinking agent is present in an amount of from 0.3 to 50 parts by weight based on 100 parts by weight of said double bond-bearing silicone base polymer.

17. The process of claim 6, wherein said addition reaction type silicone based releasing agent further comprises a release control agent comprising dimethylpolysiloxane or a silicone base polymer.

18. The process of claim 6, wherein said addition reaction type silicone based releasing agent further comprises an inhibitor selected from the group consisting of 3,5-dimethyl-1-hexyne-3-ol, 3-methyl-1-pentene-3-ol, 3-methyl-3-pentene-1-yne, 3,5-dimethyl-3-hexene-1-yne, cyclic tetravinylsiloxane, benzotriazole, and mixtures thereof.

19. The process of claim 12, wherein said addition reaction type silicone based releasing agent further comprises a photosensitizer, and said photosensitizer is present in an amount of from 0.01 to 30 parts by weight based on the total amount of said addition reaction type silicone based releasing agent and crosslinking agent.

* * * * *